United States Patent
Kauffman et al.

(10) Patent No.: US 10,241,203 B2
(45) Date of Patent: Mar. 26, 2019

(54) WEATHER RADAR INTEGRATING SYSTEM COMBINING GROUND-BASED AND AIRCRAFT-BASED WEATHER RADAR DATA

(71) Applicant: Honeywell International Inc., Morristown, NJ (US)

(72) Inventors: Donald C. Kauffman, Laurel, MD (US); Kenneth R. Jongsma, Albuquerque, NM (US)

(73) Assignee: Honeywell International Inc., Morris Plains, NJ (US)

( * ) Notice: Subject to any disclaimer, the term of this patent is extended or adjusted under 35 U.S.C. 154(b) by 857 days.

(21) Appl. No.: 14/657,996

(22) Filed: Mar. 13, 2015

(65) Prior Publication Data

US 2016/0266249 A1 Sep. 15, 2016

(51) Int. Cl.
*G01S 13/95* (2006.01)
*G01S 7/00* (2006.01)
(Continued)

(52) U.S. Cl.
CPC .............. *G01S 13/95* (2013.01); *G01S 7/003* (2013.01); *G01S 13/87* (2013.01); *G01S 13/951* (2013.01);
(Continued)

(58) Field of Classification Search
CPC ........ G01S 13/95; G01S 7/003; G01S 13/953; G01S 13/951; G01S 13/87; G01W 1/02;
(Continued)

(56) References Cited

U.S. PATENT DOCUMENTS 3,302,200 A 1/1967 Atlas
6,043,756 A 3/2000 Bateman et al.
(Continued)

FOREIGN PATENT DOCUMENTS

DE 10313653 A1 * 10/2004 .......... G01S 13/951
EP 2096470 A1 9/2009
(Continued)

OTHER PUBLICATIONS

K. Friedman, W. Pichel and Xiaofeng Li, "Mesoscale oceanic and atmospheric feature detection through fusion of RADARSAT SAR with GOES/Imager data," Geoscience and Remote Sensing Symposium Proceedings, 1998. IGARSS '98. 1998 IEEE International, Seattle, WA, 1998, pp. 907-909 vol. 2.*
(Continued)

*Primary Examiner* — Marcus E Windrich
(74) *Attorney, Agent, or Firm* — Shumaker & Sieffert, P.A.

(57) ABSTRACT

This disclosure is directed to systems, methods, and devices for integrating weather radar data from both ground-based and aircraft weather radar systems. An example system is configured to receive weather radar data from a first weather radar system. The system is further configured to receive weather radar data from one or more additional weather radar systems. The system is further configured to combine the weather radar data from the first weather radar system and the weather radar data from the one or more additional weather radar systems into a combined weather radar data set. The system is further configured to generate an output based on the combined weather radar data set.

20 Claims, 9 Drawing Sheets

(51) Int. Cl.
G01S 13/87 (2006.01)
G08G 5/00 (2006.01)
G01W 1/02 (2006.01)
G01W 1/00 (2006.01)

(52) U.S. Cl.
CPC ............ G01S 13/953 (2013.01); G01W 1/02 (2013.01); G08G 5/0013 (2013.01); G08G 5/0026 (2013.01); G08G 5/0091 (2013.01); *G01W 2001/006* (2013.01); *G01W 2203/00* (2013.01)

(58) Field of Classification Search
CPC ....... G01W 2203/00; G01W 2001/006; G08G 5/0026; G08G 5/0013; G08G 5/0091
See application file for complete search history.

(56) References Cited

U.S. PATENT DOCUMENTS

| | | | |
|---|---|---|---|
| 6,384,830 | B2 | 5/2002 | Baron et al. |
| 6,441,773 | B1 | 8/2002 | Kelly et al. |
| 6,448,922 | B1 | 9/2002 | Kelly |
| 6,707,415 | B1 | 3/2004 | Christianson |
| 6,828,922 | B1 | 12/2004 | Gremmert et al. |
| 7,307,576 | B1 | 12/2007 | Koenigs |
| 7,307,577 | B1 | 12/2007 | Kronfeld et al. |
| 7,492,304 | B1 * | 2/2009 | Woodell ............... G01S 7/285 342/26 B |
| 8,022,859 | B2 | 9/2011 | Bunch et al. |
| 8,054,214 | B2 | 11/2011 | Bunch |
| 8,085,182 | B2 | 12/2011 | Kauffman |
| 8,311,695 | B2 | 11/2012 | McKitterick |
| 8,604,963 | B1 * | 12/2013 | Kronfeld ............... G01S 7/003 342/26 B |
| 9,535,158 | B1 * | 1/2017 | Breiholz ............... G01S 13/953 |
| 2008/0255714 | A1 | 10/2008 | Ross |
| 2010/0103029 | A1 * | 4/2010 | Khatwa ............... G01S 7/22 342/26 B |
| 2014/0358441 | A1 | 12/2014 | Hale et al. |
| 2015/0239575 | A1 | 8/2015 | Sundararajan et al. |
| 2015/0243173 | A1 | 8/2015 | Esposito et al. |

FOREIGN PATENT DOCUMENTS

| | | | | |
|---|---|---|---|---|
| EP | 3128338 | A1 * | 2/2017 | .......... G01S 13/951 |
| JP | 01182783 | A * | 7/1989 | |
| JP | 2002286861 | A * | 10/2002 | |
| JP | 2014160979 | A * | 9/2014 | |
| WO | WO 2007022376 | A3 * | 9/2007 | ............... G01S 7/12 |
| WO | WO 2009071232 | A1 * | 6/2009 | ............ G01S 7/024 |

OTHER PUBLICATIONS

Extended Search Report from counterpart European Application No. 16158147.5, dated Jul. 22, 2016, 10 pp.
Kronfeld, K., "Enhanced Weather Radar (EWxR) System," Rockwell Collins, NASA/CR-2003-212406, Jun. 2003, 19 pp.
McLaughlin, D. et al., "Update on Low Cost X-band Phased Array Radar Technology for High Resolution Atmospheric Sensing Applications," WakeNet-Europe Workshop 2013, May 16, 2013, 30 pp.
Perry, T., "Tracking weather's flight path," IEEE Spectrum, vol. 37, No. 9, Sep. 2000, 8 pp.
"Rockwell Collins expands aircraft observation weather research program through new agreement with NOAA," Rockwell Collins, Inc., ASD News, Feb. 4, 2015, 2 pp.
"New Radar Technologies, Multiple Elevation Scan Option for SAILS, The Next Step in the Continuing Evolution of Dynamic Scanning," NOAA's National Weather Service, Radar Options Center, NEXRAD WSR-88D, retrieved from http://www.roc.noaa.gov/WSR88D/NewRadarTechnology/NewTechDefault.aspx on Feb. 12, 2015, 3 pp.
"RDR-4000 IntuVue™ 3D Weather Radar," Honeywell International Inc., MyAerospace Product Catalog, accessed on Feb. 12, 2015, 1 pp.
"Mark III," Honeywell International Inc., MyAerospace Product Catalog, accessed on Feb. 12, 2015, 1 pp.
"Honeywell and Inmarsat Finalize Avionics Design for GX Aviation to Bring Faster, In-Flight Connectivity to the World," Honeywell Aerospace, Feb. 7, 2013, 3 pp.
Response to Communication pursuant to Rules 70(2) and 70a(2) EPC dated Sep. 19, 2016, from counterpart European Application No. 16158147.5, dated Mar. 7, 2017, 19 pp.

* cited by examiner

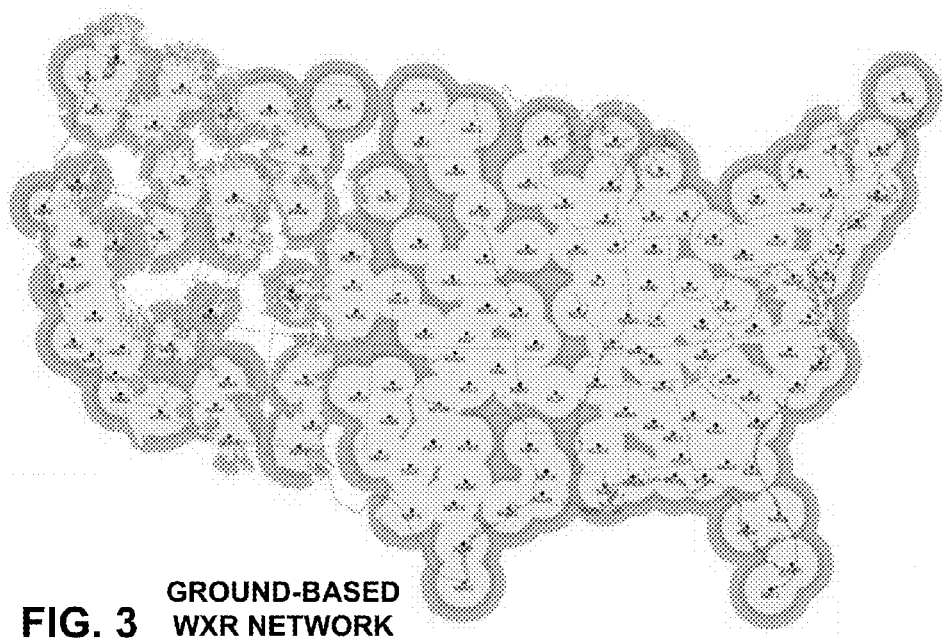
FIG. 3  GROUND-BASED WXR NETWORK COVERAGE
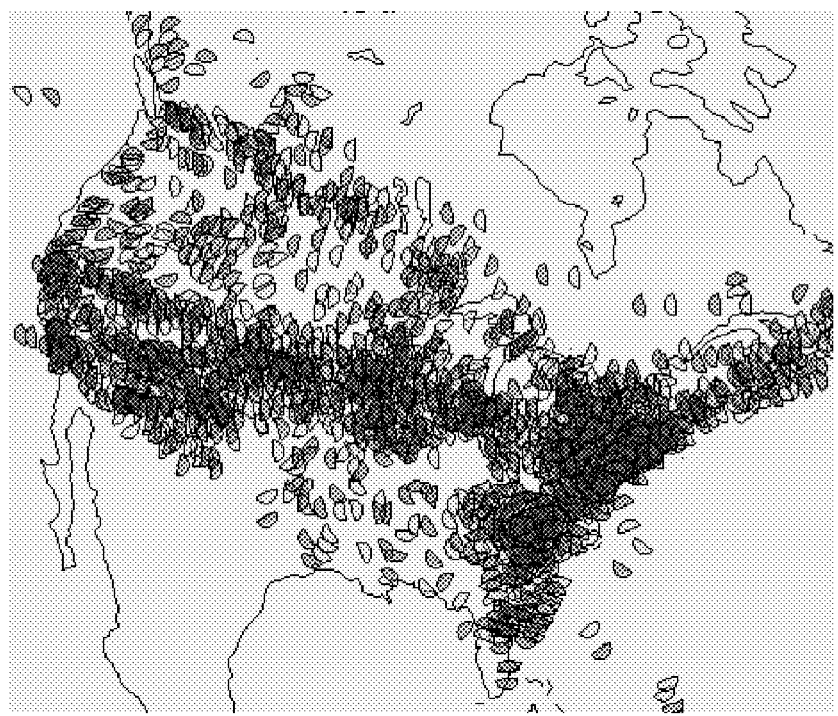
FIG. 4  TRANSIENT IN-FLIGHT AIRCRAFT WXR COVERAGE BY ONE AIRLINE ALLIANCE

WEATHER RADAR INTEGRATING SYSTEM COMBINING GROUND-BASED AND AIRCRAFT-BASED WEATHER RADAR DATA

This disclosure relates to weather radar systems.

BACKGROUND

An aircraft may use an onboard weather radar system to detect adverse weather conditions, which may enable the flight crew to make changes to the flight plan as necessary to avoid potentially hazardous weather. An aircraft in flight may also receive weather information from ground-based weather radar stations, and Air Traffic Control (ATC) instructions based on information from the ground-based weather radar stations. Up-to-date weather information may assist the flight crew in evaluating whether or how to modify a flight plan to ensure safety of the flight. The ground-based weather radar stations may be spaced out about 140 miles (about 230 kilometers) apart from each other across large areas of continental land surfaces, generally in areas of substantial air traffic. Air Traffic Control (ATC) may use information from the ground-based weather radar stations to identify convective weather regions that represent hazardous areas for aircraft operations, and direct aircraft to steer clear of hazardous areas as they are detected.

SUMMARY

This disclosure is directed to systems, devices, and methods for integrating weather radar information from airborne aircraft weather radar systems from aircraft in flight and also, in some cases, ground-based weather radar stations to provide a richer, more complete characterization of up-to-date weather information than would otherwise be possible. A multi-source weather radar integrating system of this disclosure may receive weather radar data transmitted from one or more aircraft in flight, and combine the aircraft weather radar information with ground-based or additional aircraft-based weather radar information to generate a combined or integrated weather radar information set.

Ground-based weather radar systems typically have limitations in coverage, including blind spots beyond mountainous terrain or below the radar horizon, and coarser vertical weather resolutions at the farther detection ranges of the radar. For example, in the United States, ground-based weather radar systems are typically capable of providing weather radar scans at only two or three elevations between 18.000 and 40.000 feet of altitude, typical altitudes for commercial aircraft in flight, at ranges beyond about 60 miles. This does not provide sufficient vertical resolution to determine whether some upper flight levels, which are spaced at 1,000-foot intervals, are free of convective weather (which is associated with turbulence, hail, thunderstorms, and lightning) and therefore available for safe passage of aircraft. Therefore, Air Traffic Control (ATC) and/or airline operations centers typically route aircraft entirely around two-dimensional areas of convective weather indicated at the two or three altitudes for which information is available. Additionally, ground-based weather radar systems have blind spots and complete gaps in coverage over some generally more remote and/or mountainous land areas, as well as over most oceanic surfaces, such that ground-based weather radar systems are incapable of providing guidance for aircraft in flight in those areas. A weather radar integrating system of this disclosure, by collecting aircraft weather radar information from various aircraft in flight and integrating it with ground-based weather radar information, may provide more accurate and higher resolution integrated weather radar information to ATC and/or directly to aircraft in flight, whether or not those aircraft participate in transmitting information to the weather radar integrating system.

One or more aircraft equipped with an aircraft weather radar system may at a given time be flying through or toward a region that corresponds to a blind spot or gap in coverage by a ground-based weather radar system. Additionally, modern aircraft weather radar systems typically provide finer vertical resolution than ground-based weather radar systems, especially at close range. The weather radar range of individual aircraft may trace broad paths through the sky within short periods of time and may overlap with each other and with surrounding areas of coverage by ground-based weather radar systems, such that the combination of airborne and ground-based weather radar coverage may be more accurate and higher resolution than would be possible from ground-based or aircraft weather radar coverage in isolation.

The ATC and/or the pilots of the aircraft may use this more accurate and higher resolution weather information from a weather radar integrating system of this disclosure to more accurately and more efficiently direct aircraft clear of convective weather cells or other hazardous weather conditions. For example, in many circumstances, a weather radar integrating system of this disclosure may reveal clear weather at relatively higher altitudes above convective weather cells detected by ground-based weather radar alone, such that aircraft in flight may simply climb to higher altitudes instead of re-route their headings around the convective weather cells, thereby saving time and fuel. A weather radar integrating system of this disclosure may thus promote weather hazard avoidance and help aircraft avoid unnecessary detours in flight, thereby promoting fuel efficiency and faster flights. A weather radar integrating system of this disclosure may also provide accurate integrated weather radar information to news providers, farmers, rescue services, or any other consumers of weather information who may benefit from more accurate, higher resolution, and up-to-date weather information.

One example is directed to a weather radar integrating system. The system is configured to receive weather radar data from a first weather radar system. The system is further configured to receive weather radar data from one or more additional weather radar systems. The system is further configured to combine the weather radar data from the first weather radar system and the weather radar data from the one or more additional weather radar systems into a combined weather radar data set. The system is further configured to generate an output based on the combined weather radar data set.

In another example, a method includes receiving, by one or more processors, weather radar data from a first weather radar system. The method further includes receiving, by the one or more processors, weather radar data from one or more additional weather radar systems. The method further includes combining, by the one or more processors, the weather radar data from the first weather radar system and the weather radar data from the one or more additional weather radar systems into a combined weather radar data set. The method further includes generating, by the one or more processors, an output based on the combined weather radar data set.

Another example is directed to a device comprising a computer-readable medium having program code stored thereon, the device configured for the program code to be executable by one or more processors for causing the one or more processors to receive weather radar data from a ground-based weather radar system. The program code is further executable by one or more processors for causing the one or more processors to receive weather radar data from one or more aircraft weather radar systems. The program code is further executable by one or more processors for causing the one or more processors to combine the weather radar data from the ground-based weather radar system and the weather radar data from the one or more aircraft weather radar systems into a combined weather radar data set. The program code is further executable by one or more processors for causing the one or more processors to generate an output based on the combined weather radar data set.

The disclosure is also directed to an article of manufacture comprising a computer-readable storage medium. The computer-readable storage medium comprises computer-readable instructions that are executable by a processor. The instructions cause the processor to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, read only memory (ROM), or random access memory (RAM)) or any other type of volatile or non-volatile memory or storage element that stores instructions (e.g., in the form of a computer program or other executable) to cause a processor to perform the techniques described herein. The computer-readable medium may be a non-transitory storage medium.

The details of one or more examples are set forth in the accompanying drawings and the description below. Other features, objects, and advantages will be apparent from the description and drawings, and from the claims.

BRIEF DESCRIPTION OF DRAWINGS

FIG. 3 shows a map of the ground-based weather radar coverage over the lower 48 contiguous states of the United States by an example ground-based weather radar network, the NexRad weather radar network operated by the U.S. National Weather Service (NWS), as optimized for long-range convective weather detection, as may be used by a weather radar integrating system of this disclosure in one example.

FIG. 4 shows a map of simulated combined aircraft radar coverage over and proximate to the lower 48 contiguous states of the United States by radar-equipped aircraft of one alliance of commercial airlines at an arbitrary transient moment during daytime in the continental U.S., illustrating a potential extent of aircraft weather radar coverage that may be accessible to a weather radar integrating system of this disclosure at a given moment in time, in one example.

DETAILED DESCRIPTION

Weather radar integrating techniques, systems, devices, and methods of this disclosure may collect weather radar information from both aircraft in flight and ground-based weather radar systems, and integrate the weather radar information from the multiple types of sources, thereby providing more accurate, fine-grained, and up-to-date integrated weather radar information than would be possible from either airborne or ground-based weather radar alone. Various examples of techniques, systems, devices, and methods for integrating weather radar information from both ground-based and airborne weather radar systems are further described below.

Figure 1:
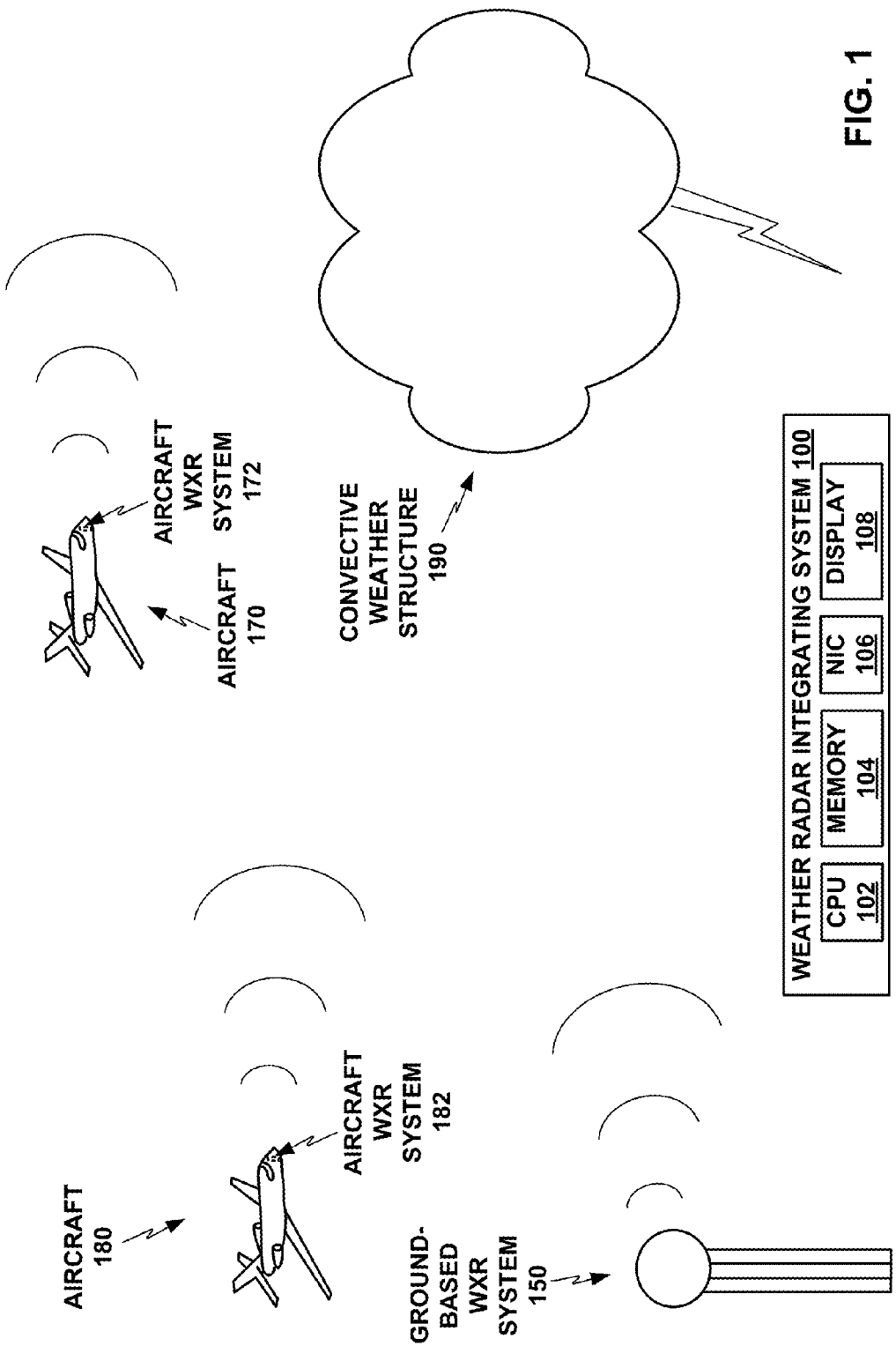
FIG. 1 depicts a conceptual block diagram of an example weather radar integrating system configured for communicative access with various aircraft in flight proximate to or with a trajectory proximate to a ground-based weather radar system and a convective weather structure, in one example.

FIG. 1 depicts a conceptual block diagram of an example weather radar integrating system 100 configured for communicative access with various aircraft 170, 180 in flight proximate to (e.g., within around 140 miles of) or with a trajectory proximate to a ground-based weather radar (WXR) system 150 and a convective weather structure 190, in one example. Weather radar integrating system 100 includes one or more processors (e.g., a CPU) 102, a memory component 104, a network interface card (NIC) 106, and a display device 108. Aircraft 170 and aircraft 180 may be commercial airliners equipped with onboard aircraft weather radar systems 172, 182, respectively. Aircraft 170 and aircraft 180 may also be equipped with Automatic Dependent Surveillance-Broadcast (ADS-B) surveillance transponders and aircraft digital communication transceivers (not shown in FIG. 1). Ground-based weather radar system 150 may be part of a network of ground-based weather radar systems such as the Next Generation Weather Radar System (NexRad) radar network operated by the National Weather Service in the United States, for example. Weather radar integrating system 100 may have a data connection with ground-based weather radar system 150 and with a position tracking service that tracks the positions of aircraft 170 and 180 in flight, such as through ADS-B cooperative surveillance messages transmitted by aircraft 170 and 180. The position tracking service may also track positions of aircraft that generate other types of cooperative surveillance messages such as Mode S (1090 MHz), Automatic Dependent Surveillance-Contract (ADS-C), and Universal Access Transceiver (UAT).

Weather radar integrating system 100 may also be configured to establish at least occasional datalink communication with aircraft 170 and 180 in flight. While the various features described above are depicted together in FIG. 1, ground-based weather radar system 150 may have a range of about 140 miles (about 230 kilometers), aircraft 170 and 180 may be tens or hundreds of miles apart from each other and from ground-based weather radar system 150, and weather radar integrating system 100 may be located anywhere, potentially hundreds or thousands of miles away from anything else depicted in FIG. 1. Weather radar integrating system 100 itself may be ground-based (e.g., at an airline operations center) or onboard an aircraft, in different implementations.

Ground-based weather radar system 150 may be adjacent to a blind spot or gap in coverage by the ground-based weather radar network of which it is a part. Ground-based weather radar system 150 may also be adjacent to mountains that block part of its coverage and cause blind spots within its normal range of coverage. Blind spots, gaps in coverage, attenuated peripheries of coverage, and areas outside the range of coverage by ground-based weather radar system 150 may be collectively referred to as "regions of inadequate coverage" by ground-based weather radar system 150. Weather radar integrating system 100 may determine a region of inadequate coverage by comparing coverage by ground-based weather radar system 150 with a preconfigured or pre-selected minimum radar coverage threshold of radar resolution or information within nominal aviation standards across a geographical range, or by receiving an input identifying the region of inadequate coverage, for example. In some cases, weather radar integrating system 100 may determine a region of interest based on an indication received via a weather information service of a convective or other severe weather pattern or other weather system of interest. Weather radar integrating system 100 may target that region of interest in similar ways to targeting a region of inadequate coverage, such as by sending data downlink requests to one or more aircraft flying through or heading toward the region of interest.

Weather radar integrating system 100 may receive weather radar data from ground-based weather radar system 150. Weather radar integrating system 100 may determine from aircraft position data that aircraft 170 and aircraft 180 are on headings toward a region of inadequate coverage by ground-based weather radar system 150, such as the gap in coverage beyond the range of ground-based weather radar system 150. Weather radar integrating system 100 may also determine that ground-based weather radar system 150 indicates the presence of convective weather structure 190 overlapping the edge of coverage of ground-based weather radar system 150 and in the path of aircraft 170 and aircraft 180 on their current headings, and that aircraft 170 is within radar range of convective weather structure 190. Weather radar integrating system 100 may combine weather radar data from both ground-based weather radar system 150 and aircraft weather radar system 172 onboard aircraft 170 in flight into a combined weather radar data set that may be more accurate and higher resolution than radar data from either individual source.

In one example, weather radar integrating system 100 may receive weather radar data from aircraft weather radar system 172 onboard aircraft 170, as well as from ground-based weather radar system 150. During a first period of time, weather radar system 172 onboard aircraft 170 may provide overlapping weather radar coverage with ground-based weather radar system 150, but with higher resolution, including higher vertical resolution, in some of the volume of the overlap, particularly toward the edge of coverage by ground-based weather radar system 150. Weather radar integrating system 100 may combine the weather radar data from ground-based weather radar system 150 and the weather radar data from aircraft weather radar system 172 onboard aircraft 170 in flight into a combined weather radar data set. Weather radar integrating system 100 may output the combined weather radar data set to an ATC authority, an airline operations center or other aircraft fleet operator operations center, and/or to the flight crew of aircraft 170 and/or aircraft 180, for example. Examples of the operation of weather radar integrating system 100 are described further below.

In some examples, weather radar integrating system 100 may also identify regions of special interest such as gaps in coverage by a ground-based weather radar network of which ground-based weather radar system 150 is a part; identify specific aircraft that are in or heading toward the regions of special interest; and transmit requests to those specific aircraft to transmit their weather radar data back to weather radar integrating system 100. Weather radar integrating system 100 may also avoid collecting weather radar data from at least some aircraft in regions that already have thorough ground-based radar coverage, thus promoting efficiency and cost-effectiveness. Weather radar integrating system 100 may thus provide more accurate and higher resolution weather radar coverage in a data-efficient and cost-effective manner.

Figure 2:
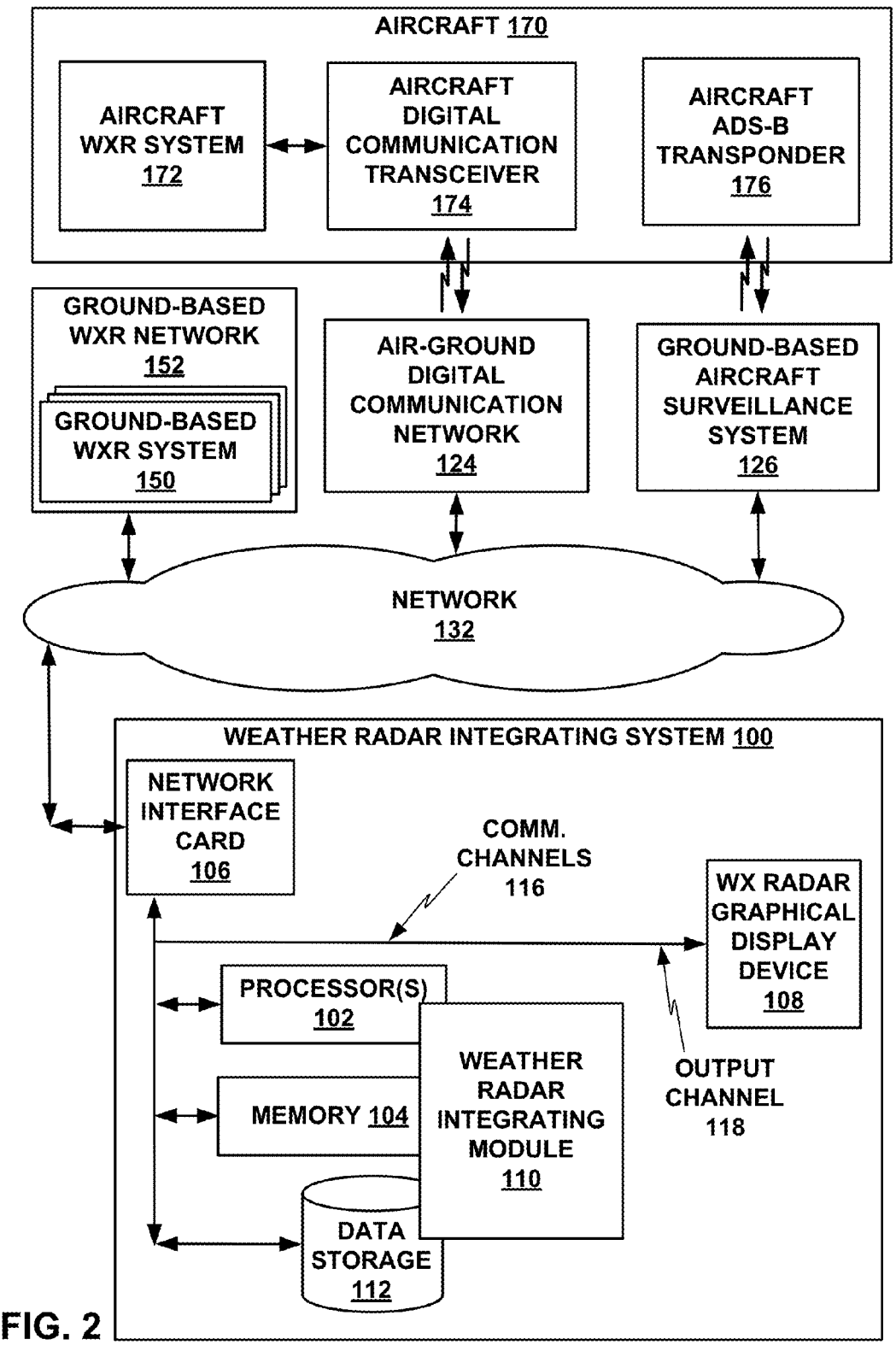
FIG. 2 shows weather radar integrating system configured for data communication with a ground-based weather radar system and an aircraft weather radar system of an aircraft, according to one example.

FIG. 2 shows weather radar integrating system 100 configured for data communication with ground-based weather radar (WXR) system 150 and aircraft weather radar system 172 of aircraft 170, according to one example. Weather radar integrating system 100 includes one or more processors 102, memory component 104, network interface card 106, and weather radar graphical display device 108, as shown in the example of FIG. 1. Weather radar integrating system 100 also includes one or more data storage components 112; communication channels 116, such as a bus, interconnecting processors 102, memory 104, network interface card 106, and data storage 112; and one or more output channels 118 configured for outputting weather radar data visualizations to weather radar graphical display device 108.

Weather radar integrating system 100 also includes weather radar integrating module 110, depicted in FIG. 2 overlapping data storage 112, memory 104, and processors 102, corresponding to weather radar integrating module 110 being stored in data storage 112, loaded into memory 104, and/or executed by one or more of the one or more processors 102. Weather radar integrating module 110 may be implemented at least in part as software comprising executable program code instructions configured for one or more processors 102 to execute. The executable instructions of weather radar integrating module 110 may be implemented at least in part as one or more software applications or portions of software applications, or one or more software libraries, classes, methods, processes, functions, routines, subroutines, or other portions of related software code, in various examples. Weather radar integrating module 110 may also be implemented at least in part in firmware, programmable logic circuit hardware (e.g., field-programmable gate array (FPGA) or complex programmable logic device (CPLD), graphical processing unit (GPU), masked gate array integrated circuit hardware, or other type of hardware. Weather radar integrating module 110 may be loaded onto weather radar integrating system 100 or incorporated as part of weather radar integrating system 100 in the initial manufacture of weather radar integrating system 100.

Weather radar integrating system 100 is connected via network interface card 106 and network 132, such as the Internet, to ground-based weather radar network 152, air-ground digital communication network 124, and ground-based aircraft surveillance system 126. Ground-based weather radar network 152 includes ground-based weather radar system 150 and other ground-based weather radar systems like it, and may be some or all of the NexRad weather radar network in one example. The data connection between weather radar integrating system 100 and ground-based weather radar network 152 may configure weather radar integrating system 100 to receive ground-based weather radar data from ground-based weather radar system 150 and others like it that form a network of ground-based weather radar coverage.

Air-ground digital communication network 124 may be a satellite digital communication service provider or a ground-based airline digital communication service provider, for example, that may provide data communication, potentially including a broadband Internet connection, to aircraft in flight via satellites or ground stations. Air-ground digital communication network 124 may enable data communication between weather radar integrating system 100 and a digital communication transceiver 174 such as a satellite communication (satcom) transceiver onboard aircraft 170, which is communicatively connected to aircraft weather radar system 172. Weather radar integrating system 100 may thus be enabled to transmit requests for data to aircraft weather radar system 172 and to receive data from aircraft weather radar system 172 while aircraft 170 is in flight.

Ground-based aircraft surveillance system 126 may track the position of aircraft 170, such as by receiving and tracking ADS-B messages or other cooperative surveillance signals transmitted by aircraft ADS-B transponder or other cooperative surveillance system onboard aircraft 170. Weather radar integrating system 100 may thus be configured to track the position of aircraft 170. By analogous position tracking of other aircraft, weather radar integrating system 100 may track the positions of a potentially large number of aircraft in flight at any one time, such as all the aircraft belonging to a commercial airline, an alliance of multiple commercial airlines, or an air cargo delivery operator. In some examples, weather radar integrating system 100 may operate under an information-sharing agreement that may enable participation of small or individual general aviation aircraft operators to receive information from weather radar integrating system 100, and to enable position tracking by weather radar integrating system 100 via ground-based aircraft surveillance system 126 for aircraft that are equipped with onboard weather radar systems and compatible cooperative surveillance transponders.

For any cooperating aircraft, weather radar integrating system 100 may compare the positions of aircraft in flight with regions of interrupted coverage or no coverage by ground-based weather radar network 152, and identify certain aircraft that provide weather radar coverage that complements gaps and blind spots in coverage by and areas out of range of ground-based weather radar network 152, and distinguish other aircraft that merely provide overlapping coverage with ground-based weather radar network 152. Weather radar integrating system 100 may then transmit requests for data only to those aircraft of interest, which in some examples are aircraft that provide complementary weather radar coverage to ground-based weather radar network 152 at a given time. In other examples, aircraft with completely overlapping coverage within full coverage areas by ground-based weather radar network 152 may still be capable of providing additional resolution that may be considered valuable, such as for more thoroughly characterizing a potential and/or newly forming convective weather structure, as weather radar integrating system 100 may initially determine based on data from ground-based weather radar network 152. In such cases, weather radar integrating system 100 may transmit requests for data to certain aircraft it identifies as proximate to or heading toward the potential and/or newly forming convective weather structure, including within a region of full coverage by ground-based weather radar network 152.

In various examples, weather radar integrating system 100 may request from aircraft weather radar system 172 that aircraft weather radar system 172 transmit certain data to weather radar integrating system 100 from a three-dimensional volumetric buffer that may be included as part of aircraft weather radar system 172. The three-dimensional volumetric buffer of aircraft weather radar system 172 may be a buffer memory in which aircraft weather radar system 172 temporarily stores weather data corresponding to three-dimensional volumes in space and at points in time corresponding to the airspace covered by aircraft weather radar system 172. Weather radar integrating system 100 may specify in a request for data downlink from the three-dimensional volumetric buffer a certain time period and volume in space of the aircraft's weather radar coverage for aircraft weather radar system 172 to return to weather radar integrating system 100. Aircraft weather radar system 172 may respond to a request by weather radar integrating system 100 by transmitting requested weather radar data to weather radar integrating system 100 via aircraft digital communication transceiver 174, air-ground digital communication network 124, and network 132.

In some implementations, weather radar integrating system 100 may be installed on an aircraft, such as aircraft 180, and weather radar integrating system 100 may combine weather radar data from another aircraft, such as aircraft 170, with weather radar data from the weather radar system onboard aircraft 180. Weather radar integrating system 100 onboard aircraft 180 may identify aircraft 170 as being ahead of and on a similar heading to aircraft 180, such that aircraft 170 may be referred to as a leader aircraft and aircraft 180 a follower aircraft. Weather radar integrating system 100 onboard aircraft 180 may request weather radar data from aircraft weather radar system 172 onboard aircraft 170 by transmitting the request to aircraft 170. Weather radar integrating system 100 onboard aircraft 180 may then receive a transmission of the requested weather radar data from aircraft weather radar system 172 onboard aircraft 170. Weather radar integrating system 100 onboard aircraft 180 may also request the weather radar data from aircraft weather radar system 182 onboard aircraft 180, such as via an onboard data network or via a direct bus connection between aircraft weather radar system 182 and weather radar integrating system 100. Weather radar integrating system 100 onboard aircraft 180 may then combine the weather radar data from aircraft weather radar system 172 onboard leader aircraft 170 and the weather radar data from aircraft weather radar system 182 onboard aircraft 180 into a combined weather radar data set, and generate an output for display in the cockpit of aircraft 180 based on the combined weather radar data set.

More generally, weather radar integrating system 100 installed onboard aircraft 180 may send a request for weather radar data to two or more aircraft weather radar systems, including aircraft weather radar system 172 onboard at least aircraft 170 from among one or more potential leader aircraft ahead of and on a similar heading as aircraft 180, and at least aircraft weather radar system 182 onboard aircraft 180, potentially also including from among either one or more additional leader aircraft and one or more additional follower aircraft, in some examples. Weather radar integrating system 100 onboard aircraft 180 may then receive the weather radar data at least from weather radar system 172 onboard the aircraft 170 from among the one or more leader aircraft and from aircraft weather radar system 182 onboard aircraft 180, and potentially also from among one or more additional leader aircraft and one or more additional follower aircraft. Thus, in examples in which weather radar integrating system 100 is installed on an aircraft, such as aircraft 180, weather radar integrating system 100 may enable combined or integrated weather radar displays onboard the aircraft, showing weather across a larger range and in higher resolution than based on only the aircraft's own weather radar.

FIG. 3 shows a map of the ground-based weather radar coverage over the lower 48 contiguous states of the United States by an example ground-based weather radar network, the NexRad weather radar network operated by the U.S. National Weather Service (NWS), as optimized for long-range convective weather detection (i.e., in NexRad's Volume Coverage Pattern 12 or VCP12 coverage mode), as may be used by weather radar integrating system 100. In particular, the outer edges of coverage as shown in FIG. 3 are at an altitude of 10,000 feet above ground level, assuming Standard Atmospheric Refraction as defined by the NWS, with the NexRad weather radar systems operating in VCP12 mode, and extend about 140 miles (about 230 kilometers) from each ground-based weather radar station in the NexRad network. As FIG. 3 shows, many flights over the western U.S. pass through breaks in coverage by NexRad ground-based weather radar systems, and many other regions in the U.S. are in marginal peripheries of coverage by NexRad radar systems. As FIG. 3 also shows, any flight over the ocean more than at most about 140 miles from the coast also passes out of range of NexRad coverage. Weather radar integrating system 100 may identify areas out of range of or in gaps or blind spots of a ground-based weather radar network as shown in FIG. 3, compare the positions of convective or otherwise hazardous weather structures with those gaps, blind spots, and out of range areas of the ground-based weather radar coverage to identify regions of interest, identify aircraft proximate to or heading toward those regions of interest, and transmit requests to those identified aircraft for airborne weather radar data.

FIG. 4 shows a map of simulated combined airborne radar coverage over and proximate to the lower 48 contiguous states of the United States by radar-equipped aircraft of one alliance of commercial airlines at an arbitrary transient moment during daytime in the continental U.S., illustrating a potential extent of airborne weather radar coverage that may be accessible to weather radar integrating system 100 at a given moment in time, in one example. The map of FIG. 4 shows a realistically simulated combined weather radar coverage from all airborne aircraft of one airline alliance on an arbitrarily selected day, with two areas of instantaneous weather radar coverage from each aircraft at a pair of moments fifteen minutes apart, with a model of the actual radar coverage each of the aircraft could provide to a weather radar integrating system 100 of this disclosure. As FIG. 4 shows, the combined airborne aircraft weather radar coverage at a random moment in the U.S. in the daytime may provide substantial coverage over the lower 48 states, including essentially complete coverage of the Eastern Seaboard, California, and some traffic routes between the two and from the Eastern Seaboard into the North Atlantic Oceanic routes to and from Europe.

Since the areas of weather radar coverage provided by the total air fleet of the airline alliance as shown in FIG. 4 constantly shifts over time, the total area covered by the airborne weather radars of the airline alliance over a day or over an hour would provide much more saturation of the national airspace than is depicted in FIG. 4. Weather radar integrating system 100 of this disclosure may potentially combine or have access to the areas of coverage of the ground-based weather radar network as shown in FIG. 3 and areas of coverage analogous to that shown in FIG. 4 to provide a much more thorough saturation of the national airspace at any moment in time than would be possible using either ground-based or airborne weather radar alone.

Figure 5:
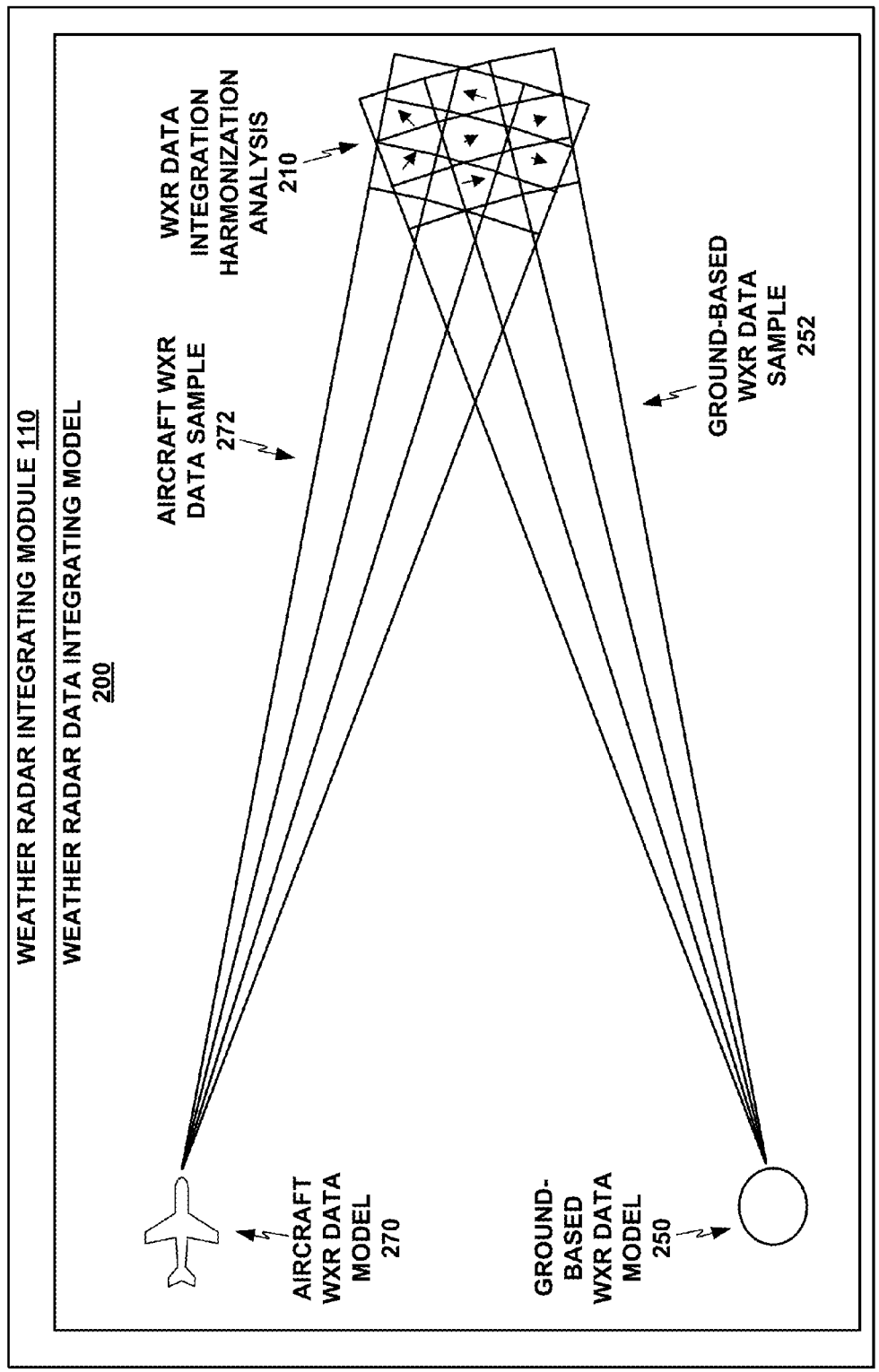
FIG. 5 shows a conceptual diagram of a weather radar integrating module of a weather radar integrating system processing a combination of weather radar data from both an airborne aircraft weather radar system and a ground-based weather radar system in a weather radar data integrating model, in one example.

FIG. 5 shows a conceptual diagram of weather radar integrating module 110 of weather radar integrating system 100 processing a combination of weather radar data from both an airborne aircraft weather radar system and a ground-based weather radar system in a weather radar data integrating model 200, in one example. Weather radar integrating module 110 may analyze position and time stamp data accompanying the weather radar data from both aircraft weather radar system 172 and ground-based weather radar system 150 to harmonize or correlate the weather radar data from the various sources, in a weather radar integration harmonization analysis 210. As part of this analysis, weather radar integrating module 110 may model the positions of the aircraft weather radar system 172 and ground-based weather radar system 150 at the time the systems 172, 150 took the data, with an aircraft weather radar (WXR) data model 270 representing the position over time of aircraft 170 and aircraft weather radar system 172, and a ground-based weather radar data model 250 representing the position of ground-based weather radar system 150. While aircraft weather radar (WXR) data model 270 and ground-based weather radar data model 250 are depicted graphically in FIG. 5, they may be processed and analyzed simply as portions of data within weather radar data integrating model 200 by weather radar integrating module 110.

As part of weather radar integration harmonization analysis 210, weather radar integrating module 110 may also model offset vectors between proximate positions in airspace between data collected by airborne and ground-based weather radar, as depicted with graphical vectors in weather radar integration harmonization analysis 210 in FIG. 5, with the vectors extending from the centers of sampling volume cells from aircraft weather radar data sample 272 to the centers of intersecting volume cells from ground-based weather data sample 252. FIG. 5 thus illustrates an example of weather radar integrating module 110 processing an analysis of how weather radar data sampled from certain volumes of airspace at certain times by an aircraft weather radar system may be combined with weather radar data sampled from certain intersecting volumes of airspace at certain overlapping times by a ground-based weather radar system, and how the data may be combined into a single data set with higher data sampling density and higher resolution in the same volume of airspace during the same period of time.

While the data sampling volumes from both aircraft and ground-based weather radar are depicted as similar sized in FIG. 5, the sampling volumes and resolutions may vary over a substantial range different between aircraft and ground-based sources in different situations, with a ground-based weather radar system typically providing excellent resolution (and thus small data sample volumes) within the more central portion of its range, and with aircraft-borne weather radar systems typically providing excellent resolution proximate to and forward of the aircraft's current and recent positions. While FIG. 5 shows weather radar integrating module 110 processing a combination of weather radar data from a single airborne aircraft weather radar system and from a single ground-based weather radar system, weather radar integrating module 110 may also process a combination of weather radar data from two or more airborne aircraft weather radar systems and/or from two or more ground-based weather radar systems. The ground-based weather radar system and the aircraft weather radar systems may also operate with different technologies, different radar scanning techniques, and different data standards, and weather radar integrating system 100 may convert weather radar data from these different techniques and/or formats into a uniform data format, as part of the process of integrating the weather radar data from the various sources into a single, higher-resolution weather radar data set.

Figure 6:
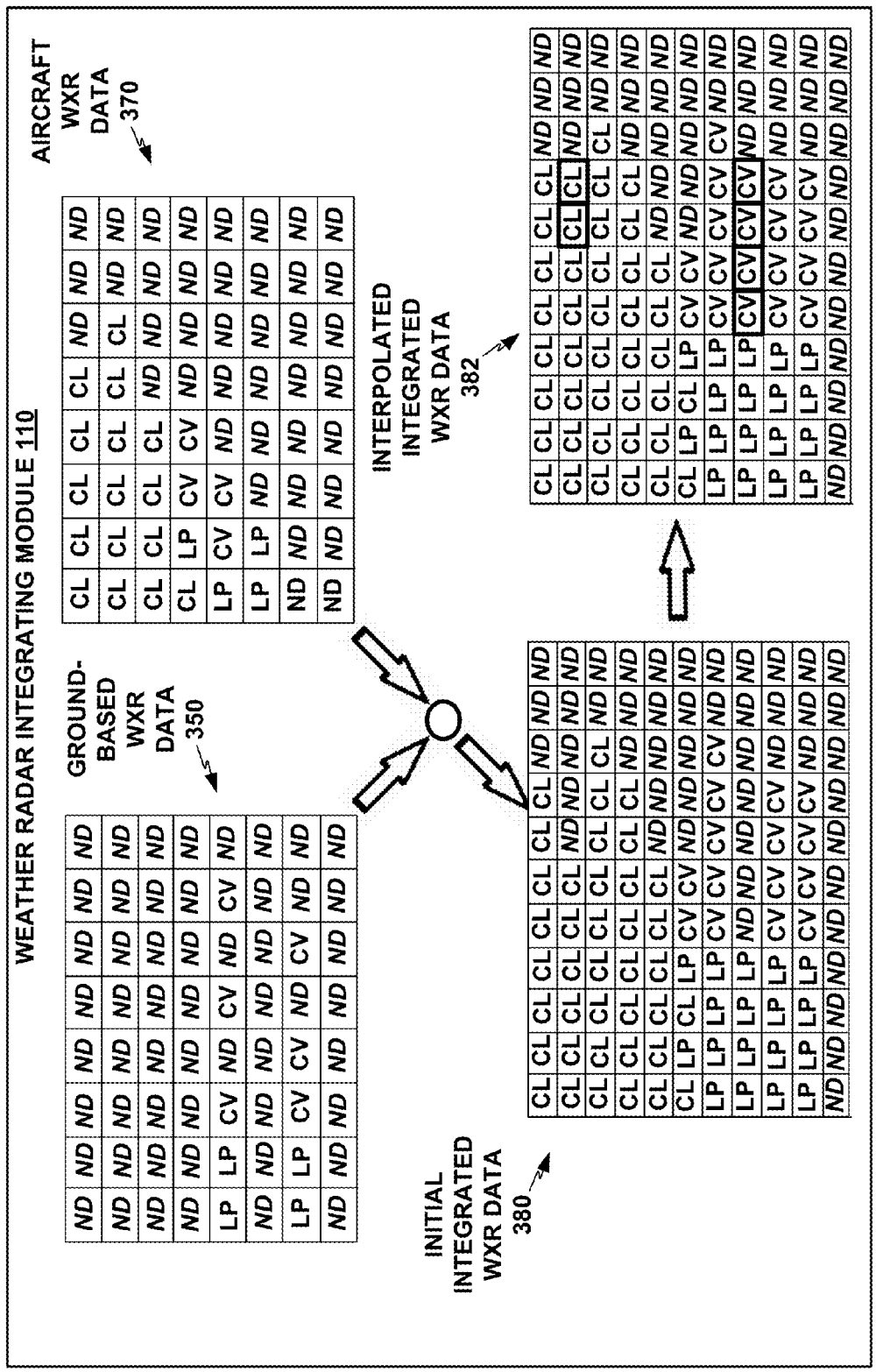
FIG. 6 depicts a simplified, conceptual diagram of a weather radar integrating module of a weather radar integrating system processing a combination of both ground-based weather radar data from a ground-based weather radar system and aircraft weather radar data from an airborne aircraft weather radar system into an initial integrated data set 380 and then into a single, interpolated, integrated weather radar data set, in one example.

FIG. 6 depicts a simplified, conceptual diagram of weather radar integrating module 110 of weather radar integrating system 100 processing a combination of both ground-based weather radar data 350 from a ground-based weather radar system and aircraft weather radar data 370 from an airborne aircraft weather radar system into an initial integrated data set 380 and then into a single, interpolated, integrated weather radar data set 382, in one example. In FIG. 6, a two-dimensional representative sample (over radial distance and vertical height) of ground-based weather radar data 350 is depicted being combined by weather radar integrating module 110 with a two-dimensional sample of aircraft weather radar data 370 from substantially the same time and volume of airspace. FIG. 6 depicts each of the volume sampling cells with either "CL" for weather radar data indicating "clear" weather; "LP" for weather radar data indicating "light precipitation;" "CV" for weather radar data indicating "convective" and potentially hazardous weather; and "ND" for "no data." In another implementation, each cell might include a value representing the radar reflectivity measured from that cell. The airspace sampling volume cells thus labeled as depicted in FIG. 6 in ground-based weather radar data 350 and aircraft weather radar data 370 may represent weather radar integrating module 110 having translated, converted, or labeled the weather radar data from different sources and potentially in different formats, and which may be based on measures of reflectivity of transmitted weather radar signals, with such a uniform description scheme, as part of integrating the weather radar data sets.

As FIG. 6 shows, ground-based weather radar data 350 is relatively sparse, with much of the airspace sampling cells showing no data ("ND"), which may correspond to coverage near the edge of range of ground-based weather radar system 150, and with data sampling at only perhaps two, relatively lower discrete altitudes. What data ground-based weather radar data 350 does show includes substantial indications of convective ("CV") weather across much of the sampling range, a likely interpretation of which would indicate a large convective weather structure (such as convective weather structure 190 shown in FIG. 1) covering a substantial but unknown span of the airspace covered by the available data.

Aircraft weather radar data 370 shows denser sampling at higher altitudes and to the left side, which may correspond to airspace proximate to aircraft 170 hosting aircraft weather radar system 172 as the source of the data, but shows many data cells with no data at lower altitudes and farther from the source radar system. The airspace volume cells that do have available data in aircraft weather radar data 370 include a significant swath of clear ("CL") weather at higher altitudes.

As graphically depicted in FIG. 6, weather radar integrating module 110 may combine the data from ground-based weather radar data 350 and aircraft weather radar data 370 into initial integrated weather radar data set 380. Initial integrated weather radar data set 380 has higher resolution (and smaller effective airspace volume cell sampling size, as shown) due to combining all the data from the multiple sources. Subsequent to combining the weather radar data into initial integrated weather radar data set 380, weather radar integrating module 110 may also interpolate data between groups of adjacent airspace volume cells to fill in airspace volume cells that still have no data, where enough airspace volume cells that surround a no-data cell have consistent enough data to exceed a threshold of confidence for the accuracy of the interpolation. By making such data interpolations to assign data labels to no-data airspace volume cells to match a sufficient number of surrounding cells with consistent data, weather radar integrating module 110 may generate interpolated integrated weather radar data set 382 as a further processed integrated weather radar data set based on initial integrated weather radar data set 380. Examples of interpolated data assigned to previously no-data airspace volume cells by weather radar integrating module 110 are shown in bold bordering in interpolated integrated weather radar data set 382, including a group of convective ("CV") airspace volume cells at a lower altitude and a group of clear weather ("CL") airspace volume cells at a higher altitude. Weather radar integrating module 110 may in some examples perform other processing to the weather radar data as part of generating a finalized form of an integrated weather radar data set as its output.

Figure 7:
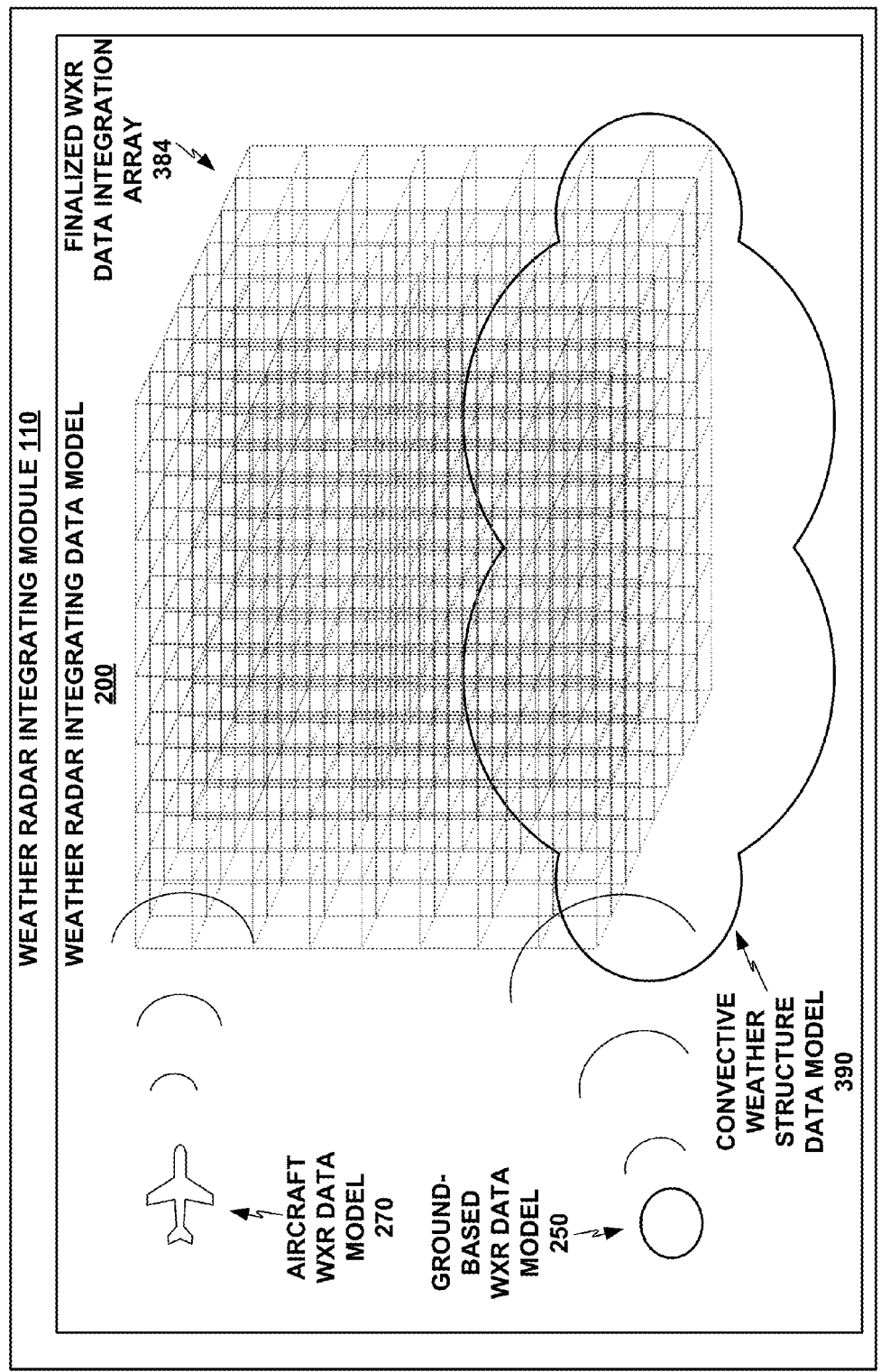
FIG. 7 shows a conceptual diagram of an updated, finalized form of a weather radar data integrating model for a given moment of time generated by a weather radar integrating module of a weather radar integrating system after processing a combination of weather radar data from both an airborne aircraft weather radar system and a ground-based weather radar system, to generate a high-resolution data model of a convective weather structure modeled by a convective weather structure data model as integrated from both airborne and ground-based weather radar data, in one example.

FIG. 7 shows a conceptual diagram of an updated, finalized form of weather radar data integrating model 200 for a given moment of time generated by weather radar integrating module 110 of weather radar integrating system 100 after processing a combination of weather radar data from both an airborne aircraft weather radar system and a ground-based weather radar system, to generate a high-resolution data model of a convective weather structure modeled by convective weather structure data model 390 as integrated from both airborne and ground-based weather radar data, in one example. Weather radar integrating module 110 may generate finalized weather radar data integration array 384 based on a complete set of integrated weather radar data for a given moment or defined short period of time, as illustrated with the two-dimensional example portion shown in FIG. 6 as interpolated integrated weather radar data 382, which may be a small, representative portion example of finalized weather radar data integration array 384. Finalized weather radar data integration array 384 may thoroughly characterize convective weather structure data model 390 in three dimensions at the highest resolution available from the integrated aircraft weather radar data and ground-based weather radar data. Weather radar integrating system 100 may use finalized weather radar data integration array 384 as the basis for outputs such as three-dimensional (or two-dimensional) graphical weather radar visualizations, which may be used by ATC personnel, airline or air cargo delivery operations center personnel, or the pilots of aircraft 170 and/or other affected aircraft.

Weather radar integrating module 110 may thus generate an integrated weather radar data set 382 and finalized weather radar data integration array 384 that may provide substantially finer data sampling and higher resolution than the weather radar data from any individual ground-based or airborne weather radar system. In particular, in this example, whereas the weather radar data from ground-based weather radar system 150 and from aircraft weather radar system 172 onboard aircraft 170 both showed a convective weather structure intersecting the trajectory of aircraft 170, finalized weather radar data integration array 384 generated by weather radar integrating module 110 may reveal a large volume of clear weather at higher altitudes than the current trajectory of aircraft 170, above convective weather structure 190 (as shown in FIG. 1), which weather radar integrating system 100 shows to be actually limited to lower altitudes.

Thus, an ATC or airline or air cargo delivery operations center using the output of weather radar integrating system 100 may advise the pilot of aircraft 170 to climb to a higher-altitude air traffic flight level to pass a safe margin above the convective weather structure, instead of altering course to fly laterally around the convective weather structure, which may have been the likely outcome from relying on ground-based weather radar system 150 alone, as described below with reference to FIGS. 8 and 9. Weather radar integrating system 100 may also transmit outputs, such as weather radar visualizations based on its higher-resolution weather radar data, to aircraft 170 as well as to aircraft 180 which trails aircraft 170 along the same route, for the pilots of aircraft 170 and 180 to personally view and consider.

Additionally, the output of weather radar integrating system 100 may be transmitted to and/or used to advise the pilot of aircraft 180 (shown in FIG. 1) which may also be approaching convective weather structure 190 but not yet in range to pick it up on its own aircraft weather radar system 182. An ATC or airline or air cargo delivery operations center may thus advise the pilot of aircraft 180 to climb to a higher altitude to set a trajectory through the clear weather above the convective weather structure, when no indication of such a trajectory would have been available from either ground-based weather radar system 150 or aircraft weather radar system 182 onboard aircraft 180. Weather radar integrating system 100 may thus promote fuel-efficient and time-saving re-routing of aircraft trajectories to avoid potentially hazardous weather.

Figure 8:
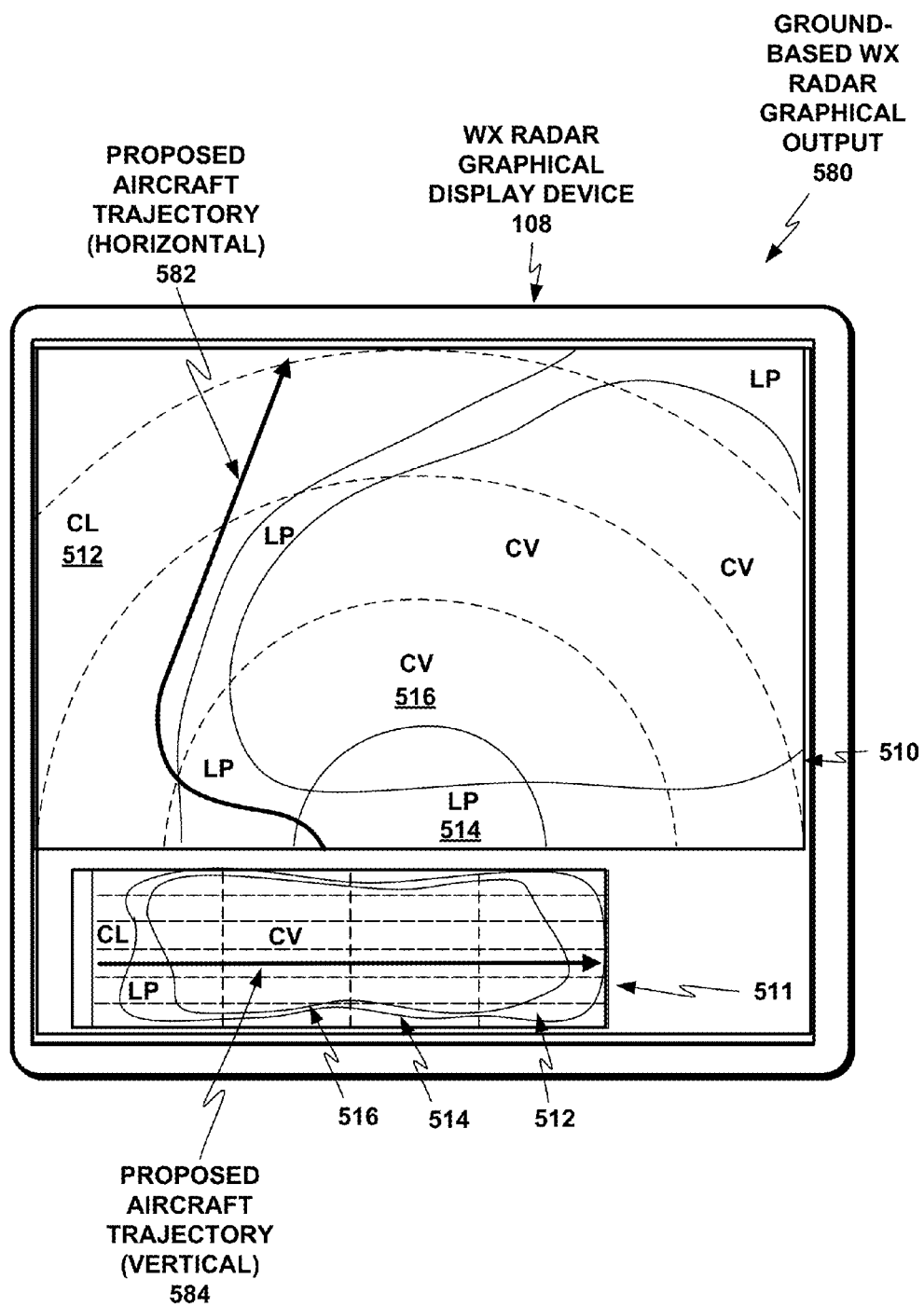
FIG. 8 shows a conceptual graphical depiction of a weather radar graphical display device that may be included in or communicatively coupled to a weather radar integrating system, but that displays only a ground-based weather radar graphical output, based only on data from ground-based weather system (such as before initializing or implementing a process of generating integrated aircraft and ground-based weather radar data).

FIG. 8 shows a conceptual graphical depiction of a weather radar graphical display device 108 that may be included in or communicatively coupled to weather radar integrating system 100, but that displays only a ground-based weather radar graphical output 580 (including a horizontal weather radar output 510 and a vertical weather radar output 511), based only on data from ground-based weather radar system 150 (such as before initializing or implementing a process of generating integrated airborne and ground-based weather radar data). In contrast, FIG. 9 shows a conceptual graphical depiction of a weather radar graphical display device 108 that may be included in or communicatively coupled to weather radar integrating system 100, that displays an integrated weather radar graphical output 680 based on data from both ground-based weather radar system 150 and aircraft weather radar system 172 (such as after initializing or implementing a process of generating integrated airborne and ground-based weather radar data), in one example. Weather radar integrating system 100 may generate integrated weather radar graphical output 680 based on finalized weather radar data integration array 384 as shown in FIG. 7 and described above as the result of the processing described with reference to FIGS. 1-7.

In FIG. 8, ground-based weather radar graphical output 580 includes a horizontal weather radar output 510 and a vertical weather radar output 511, both showing areas of convective ("CV") weather structure 516, light precipitation ("LP") 514, and clear ("CL") weather 512, as best determined based on the ground-based weather radar alone, in a region affected by its range periphery and potential blind spots or gaps in coverage. Ground-based weather radar graphical output 580 also shows a proposed aircraft trajectory (horizontal component) 582 in horizontal weather radar output 510 and a proposed aircraft trajectory (vertical component) 584 in vertical weather radar output 511, showing the proposed trajectory routing wide around the indicated convective weather structure 516. The proposed trajectory 582, 584 may be entered by ATC or airline operations personnel, or generated automatically.

Figure 9:
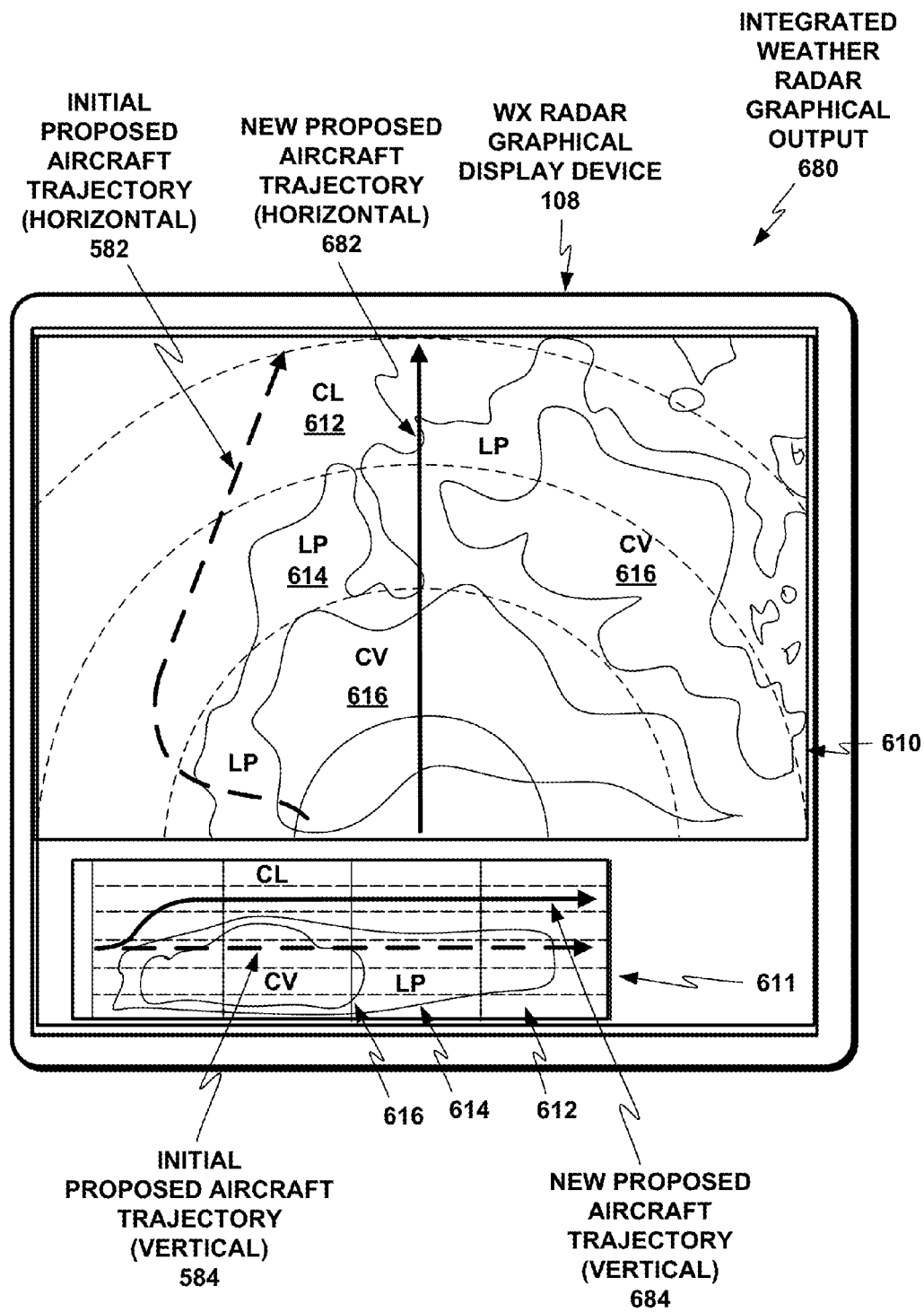
FIG. 9 shows a conceptual graphical depiction of a weather radar graphical display device that may be included in or communicatively coupled to a weather radar integrating system, that displays an integrated weather radar graphical output based on data from both a ground-based weather system and an aircraft weather radar system (such as after initializing or implementing a process of generating integrated aircraft and ground-based weather radar data), in one example.

In FIG. 9, integrated weather radar graphical output 680 includes a horizontal weather radar output 610 and a vertical weather radar output 611, also both showing areas of convective ("CV") weather structure 616, light precipitation ("LP") 614, and clear ("CL") weather 612, as determined by weather radar integrating system 100 based on its integrated weather radar output, such as based on finalized weather radar data integration array 384. As FIG. 9 shows, the extent of convective weather structure 616 has been substantially narrowed down with the benefit of more and higher-resolution data from the integration of both airborne and ground-based weather radar data sources. Integrated weather radar graphical output 680 also shows a proposed aircraft trajectory 682, 684, which may be entered by ATC or airline operations personnel, or generated automatically by weather radar integrating system 100 in various examples. In particular, integrated weather radar graphical output 680 shows new proposed aircraft trajectory (horizontal component) 682 in horizontal weather radar output 610 and new proposed aircraft trajectory (vertical component) 684 in vertical weather radar output 611, showing the new proposed trajectory continuing straight through directly following its original heading horizontally, and only being modified by climbing vertically to pass above the convective weather structure 616.

In examples of weather radar integrating system 100 generating an automated new suggested trajectory (e.g., proposed trajectory 682, 684 of FIG. 9) based on the integrated weather radar data output, weather radar integrating system 100 may first determine whether a convective weather structure exists in a region corresponding to the combined weather radar data set, and then determine whether a non-convective region exists above the convective weather structure within an ordinary aircraft flight altitude range, as in the example discussed above. Weather radar integrating system 100 may then, in response to determining that a non-convective region exists above the convective weather structure within an ordinary aircraft flight altitude range, identify an aircraft in flight with a heading toward the convective weather structure, e.g., aircraft 170 and/or aircraft 180; determine a potential change of heading for the identified aircraft through the non-convective region above the convective weather structure (e.g., new proposed trajectory 682, 684 of FIG. 9, contrasted with the initial proposed trajectory 582, 584); and output the potential change of heading for the identified aircraft (e.g., as shown in FIG. 9). The new proposed trajectory automatically generated by weather radar integrating system 100, taking advantage of the superior characterization of the weather system to have the aircraft climb to a higher altitude to fly over the convective weather instead of flying around the convective weather, may be considered as a suggestion by ATC, airline operations personnel, or the pilot of an aircraft. Weather radar integrating system 100 may thereby enable an aircraft (e.g., aircraft 170, 180) to avoid convective weather structures along more efficient and time-saving routes than may be possible by reliance on any one type of weather radar data source, particularly around peripheries, blind spots, and gaps in coverage by a ground-based weather radar network.

In some examples, the outputs of weather radar integrating system 100 may be made available to other subscribers, such as commercial weather reporting services and news services, agricultural concerns, and remote search and rescue services, for example. In these examples, weather radar integrating system 100 may include security and authentication features to allow subscribers to establish network connections with weather radar integrating system 100, and weather radar integrating system 100 may communicate its outputs via network interface card and network 132 to validated subscribers.

Figure 10:
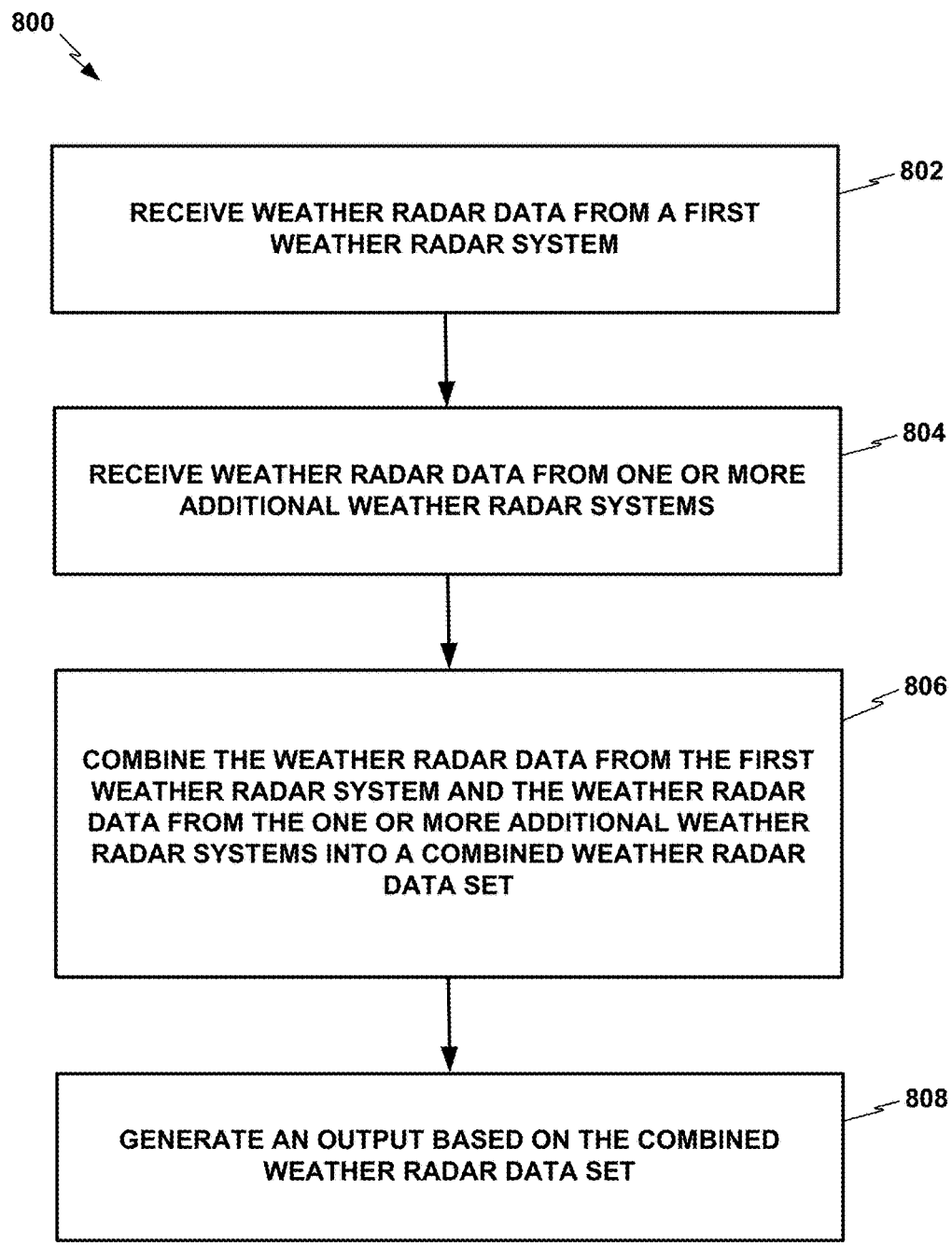
FIG. 10 shows a flowchart for an example method for generating an integrated weather radar output, as may be implemented, performed, executed, and/or embodied by a weather radar integrating system, in accordance with illustrative aspects of this disclosure.

FIG. 10 shows a flowchart for an example method 800 for generating an integrated weather radar output, as may be implemented, performed, executed, and/or embodied by weather radar integrating system 100, in accordance with illustrative aspects of this disclosure. Method 800 includes receiving, by one or more processors (e.g., one or more processors 102 of weather radar integrating system 100 executing instructions from program code of weather radar integrating module 110), weather radar data from a first weather radar system (e.g., weather radar integrating system 100 receiving weather radar data from ground-based weather radar system 150) (802). Method 800 further includes receiving, by the one or more processors (e.g., one or more processors 102 of weather radar integrating system 100 executing instructions from program code of weather radar integrating module 110), weather radar data from one or more additional weather radar systems (e.g., weather radar integrating system 100 receiving weather radar data from airborne aircraft weather radar system 172 onboard aircraft 170 in flight) (804).

Method 800 further includes combining, by the one or more processors (e.g., one or more processors 102 of weather radar integrating system 100 executing instructions from program code of weather radar integrating module 110), the weather radar data from the first weather radar system and the weather radar data from the one or more additional weather radar systems into a combined weather radar data set (e.g., weather radar integrating system 100 combining aircraft weather radar data sample 272 and ground-based weather radar data sample 252, and/or combining ground-based weather radar data 350 and aircraft weather radar data 370, to perform weather radar data integration harmonization analysis 210, and/or to generate initial integrated weather radar data 380, interpolated integrated weather radar data 382, finalized weather radar data integration array 384, convective weather structure data model 390, and/or integrated weather radar graphical output 680 (806). Method 800 further includes generating, by the one or more processors (e.g., one or more processors 102 of weather radar integrating system 100 executing instructions from program code of weather radar integrating module 110), an output based on the combined weather radar data set (e.g., weather radar integrating system 100 outputting integrated weather radar graphical output 680 via output channel 118 to weather radar graphical display device 108, and/or outputting integrated weather radar graphical output 680 or other representation of finalized weather radar data integration array 384, convective weather structure data model 390, or any other weather radar output via network interface card 106 and network 132 to aircraft 170, aircraft 180, another subscriber to the integrated weather radar outputs of weather radar integrating system 100, or another output destination) (808).

Some additional details of some examples are described below. In some examples, the weather radar data may include, for example, radar reflectivity data in an earth-referenced three-dimensional (or "volumetric") memory buffer (e.g., in one or more memory components 104 and/or data storage components 112 in weather radar integrating system 100). The memory buffer may include aircraft radar imaging data combined with sources of three-dimensional geographic and atmospheric data and sources of three-dimensional aircraft data on an aircraft's position, altitude, heading, and speed, for example. One or more processors onboard the aircraft may combine the three-dimensional radar imaging data, the geographic and atmospheric data, and the aircraft data to transmit to weather radar integrating system 100, which may load and/or store such data to the memory buffer and/or in other data storage (e.g., memory 104 and/or data storage 112). Aircraft weather radar system 172 onboard aircraft 170 may be configured to scan the entire three-dimensional space in front of the aircraft, and processors of aircraft weather radar system 172 may temporarily store the reflectivity data in the three-dimensional memory buffer. The one or more processors onboard the aircraft may periodically update the memory buffer with newly obtained weather radar data, which may take place after aircraft 170 has transmitted requested data to weather radar integrating system 100. With the three-dimensional volumetric buffer data, the weather radar data is not constrained to a single tilt-plane such as is inherent to conventional radar.

In some examples, weather radar integrating system 100 may generate the weather radar output configured for a high-resolution display enabled for display of a three-dimensional (3D) view of the weather structure and the reflectivity range of each of its portions. This high-resolution display of the weather structure may be enabled for a high resolution in time, such as a high frame rate (e.g., above a selected frame rate, with a frequent rate of updates of weather radar data from ground-based and aircraft-based weather radar data, potentially asynchronously as new data arrives from at least any one source). In addition, or instead, this high-resolution display of the weather structure and the reflectivity range of each of its portions may also be enabled for a high range (e.g., above a selected distance threshold). The high-resolution display of the weather structure and the reflectivity range of its portions may contribute to the richness and resolution of the aircraft weather radar data provided to weather radar integrating system 100.

The techniques of this disclosure may be implemented in a device or article of manufacture comprising a computer-readable storage medium. The term "processor," as used herein may refer to any of the foregoing structure or any other structure suitable for processing program code and/or data or otherwise implementing the techniques described herein. Elements of weather radar integrating system 100 and/or processors 102 thereof, and/or system elements for executing and/or storing weather radar integrating module 110 or features thereof as disclosed above, may be implemented in any of a variety of types of solid state circuit elements, such as central processing units (CPUs), digital signal processors (DSPs), application-specific integrated circuits (ASICs), a magnetic nonvolatile random-access memory (RAM) or other types of memory, a mixed-signal integrated circuit, a field programmable gate array (FPGA), a microcontroller, a programmable logic controller (PLC), a system on a chip (SoC), a subsection of any of the above, an interconnected or distributed combination of any of the above, or any other integrated or discrete logic circuitry, or any other type of component or one or more components capable of being configured in accordance with any of the examples disclosed herein. One or more memory devices 104 may include any volatile or non-volatile media, such as a RAM, ROM, non-volatile RAM (NVRAM), electrically erasable programmable ROM (EEPROM), flash memory, and the like. One or more memory devices 104 may store computer readable instructions that, when executed by one or more processors 102, cause the one or more processors 102 to implement the techniques attributed to weather radar integrating module 110 herein.

Elements of weather radar integrating module 110 may be programmed with various forms of software. Weather radar integrating module 110 may be implemented at least in part as, or include, one or more executable applications, application modules, libraries, classes, methods, objects, routines, subroutines, firmware, and/or embedded code, for example. Elements of weather radar integrating module 110 as in any of the examples herein may be implemented as a device, a system, an apparatus, and may embody or implement a method of integrating weather radar data, including for implementing example method 800 as described with reference to FIG. 8.

The techniques of this disclosure may be implemented in a wide variety of computing devices. Any components, modules or units have been described provided to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

Aircraft weather radar system 172 may be implemented on any type of aircraft. An "aircraft" as described and claimed herein may include any fixed-wing or rotary-wing aircraft, airship (e.g., dirigible or blimp buoyed by helium or other lighter-than-air gas), suborbital spaceplane, spacecraft, expendable or reusable launch vehicle or launch vehicle stage, or other type of flying device. An "aircraft" as described and claimed herein may include any crewed or uncrewed craft (e.g., uncrewed aerial vehicle (UAV), flying robot, or automated cargo or parcel delivery craft). While some examples are described in terms of weather radar integrating system 100 generating graphical weather radar outputs to weather radar graphical display device 108 for graphical display for ATC or airline operations personnel or a pilot, in other examples, weather radar integrating system 100 may communicate integrated weather radar outputs to another system, component, device, software module, computer, or other feature. For example, in an automated navigation system or in an uncrewed aircraft that may not include a graphical radar display, weather radar integrating system 100 may communicate processed weather radar outputs to a software module, computer, embedded circuit, or other feature that performs automated navigation. In these examples, weather radar integrating system 100 may generate outputs that may enable an automatic software-based navigation and/or piloting system to make decisions based on accurate and high-resolution characterization of convective weather structures.

Various illustrative aspects of the disclosure are described above. These and other aspects are within the scope of the following claims.

What is claimed is:

1. A system comprising:
   a memory; and
   one or more processors coupled to the memory, the one or more processors configured to:
      receive first weather radar data from a first weather radar system;
      receive second weather radar data from one or more additional weather radar systems;
      integrate the first weather radar data and the second weather radar data into a combined weather radar data set;
      convert the first weather radar data and the second weather radar data into a uniform data format;
      select weather radar data from the second weather radar data that corresponds to substantially a same time and volume of airspace as the first weather radar data;
      generate the combined weather radar data set from an initial integrated data set comprising a plurality of horizontal and vertical volume cells, wherein the one or more processors fill each volume cell of the plurality of volume cells from either the selected weather radar data or from the first weather radar data based on predetermined criteria; and
      generate an output based on the combined weather radar data set, wherein the output comprises a weather radar map, wherein the weather radar map comprises:
         a horizontal weather radar output and a vertical weather radar output;
         the first weather radar data in volume cells lacking data from the selected weather radar data;
         the selected weather radar data from the one or more additional weather radar systems in volume cells lacking data from the first weather radar data; and
         both the first weather radar data from the first weather radar system and the selected weather radar data from the one or more additional weather radar systems in volume cells with coverage from both the first weather radar system and the one or more additional weather radar systems.

2. The system of claim 1, wherein the first weather radar system comprises a ground-based weather radar system, and the one or more additional weather radar systems comprise one or more aircraft weather radar systems.

3. The system of claim 2, wherein the one or more processors are further configured to:
determine a region of interest;
identify one or more aircraft in flight proximate to the region of interest; and
transmit a request for weather radar data to the one or more aircraft,
wherein the second weather radar data from the one or more aircraft weather radar systems is received in response to the request for weather radar data to the one or more aircraft.

4. The system of claim 1, wherein the one or more processors are further configured to:
determine which volume cells of the plurality of volume cells contain substantially no data;
interpolate data between groups of volume cells adjacent to the volume cells that contain substantially no data, such that the one or more processors fill volume cells that have substantially no data with interpolated weather radar data, based on whether the volume cells adjacent to the volume cells that contain substantially no data contain data that exceeds a threshold of confidence for an accuracy of interpolation.

5. The system of claim 3, wherein the one or more processors are further configured such that determining the region of interest comprises determining a region of inadequate coverage by the ground-based weather radar system by comparing coverage by the ground-based weather radar system with a radar coverage threshold across a geographical range.

6. The system of claim 3, wherein the one or more processors are further configured such that determining the region of interest comprises being configured to receive an indication via a weather information service indicating a region containing a weather system of interest.

7. The system of claim 1, wherein the predetermined criteria to generate the initial integrated data set comprises one or more of presence or absence of weather radar data for each volume cell, resolution level of weather radar data, a distance of each volume cell from the first weather radar system or from the one or more additional weather radar systems.

8. The system of claim 1, wherein the first weather radar system comprises a first aircraft weather radar system, and the one or more additional weather radar systems comprise one or more additional aircraft weather radar systems, wherein the one or more processors are further configured to:
identify one or more leader aircraft operating in or heading toward a region of interest;
identify one or more follower aircraft behind and on a similar heading to the one or more leader aircraft;
send a request for weather radar data to two or more aircraft weather radar systems including an aircraft weather radar system onboard at least a first aircraft from among the one or more leader aircraft and an aircraft weather radar system onboard at least a second aircraft from among either the one or more leader aircraft and the one or more follower aircraft,
wherein receiving the weather radar data from the first weather radar system comprises receiving weather radar data from the aircraft weather radar system onboard the first aircraft from among the one or more leader aircraft and from the aircraft weather radar system onboard the second aircraft from among either the one or more leader aircraft and the one or more follower aircraft,
wherein the one or more processors are further configured to transmit the output based on the combined weather radar data set to the one or more follower aircraft.

9. The system of claim 1, wherein the one or more processors are further configured to communicate the output based on the combined weather radar data set for display at a ground-based aircraft operations system.

10. The system of claim 1, wherein the one or more processors are further configured to communicate the output based on the combined weather radar data set to one or more aircraft in flight.

11. The system of claim 1, wherein the one or more processors are further configured to communicate the output based on the combined weather radar data set to one or more subscribers.

12. The system of claim 1, wherein the one or more processors are further configured to:
determine whether a convective weather structure exists in a region corresponding to the combined weather radar data set;
in response to determining that a convective weather structure exists in a region corresponding to the combined weather radar data set, determine whether a non-convective region occurs at a higher altitude above the convective weather structure within an aircraft ordinary flight altitude range;
identify an aircraft in flight with a heading toward the convective weather structure;
determine a potential change of at least one of heading and altitude for the identified aircraft through the non-convective region above the convective weather structure; and
output the potential change of the at least one of heading and altitude to the identified aircraft in flight with a heading toward the convective weather structure.

13. The system of claim 1, wherein the one or more processors being configured to combine the first weather radar data from the first weather radar system and the second weather radar data from the one or more additional weather radar systems into the combined weather radar data set comprises the one or more processors being configured to combine resolution in overlapping areas of both the first weather radar data from the first weather radar system and the second weather radar data from the one or more additional weather radar systems.

14. A method comprising:
receiving, by one or more processors, first weather radar data from a first weather radar system;
receiving, by the one or more processors, second weather radar data from one or more additional weather radar systems;
converting, by the one or more processors, the first weather radar data and the second weather radar data into a uniform data format;
selecting, by the one or more processors, weather radar data from second weather radar data that corresponds to substantially the same time and volume of airspace as the first weather radar data;

integrating, by the one or more processors, the selected weather radar data into an initial integrated data set comprising a plurality of horizontal and vertical volume cells, wherein the one or more processors fill each volume cell of the plurality of volume cells from either the selected weather radar data or from the first weather radar data based on predetermined criteria;

combining, by the one or more processors, the initial integrated data set into a combined weather radar data set; and generating, by the one or more processors, an output based on the combined weather radar data set, wherein the output comprises a weather radar map, wherein the weather radar map comprises:

a horizontal weather radar output and a vertical weather radar output;

the first weather radar data from the first weather radar system in volume cells lacking data from the selected weather radar data;

the selected weather radar data from the one or more additional weather radar systems in volume cells lacking data from the first weather radar data; and both the first weather radar data from the first weather radar system and the selected weather radar data from the one or more additional weather radar systems in volume cells with coverage from both the first weather radar system and the one or more additional weather radar systems.

15. The method of claim 14, further comprising:
determining a region of inadequate coverage by the first weather radar system;
identifying one or more aircraft in flight proximate to the region of inadequate coverage by the ground-based weather radar system; and
transmitting a request for weather radar data to the one or more aircraft,
wherein the second weather radar data from the one or more additional weather radar systems is received in response to the request for weather radar data to the one or more aircraft.

16. The method of claim 15, wherein identifying the one or more aircraft in flight proximate to the region of inadequate coverage comprises identifying one or more locations of the one or more aircraft via surveillance transmissions of the one or more aircraft.

17. The method of claim 14, further comprising:
determining whether a convective weather structure exists in a region corresponding to the combined weather radar data set;
in response to determining that a convective weather structure exists in a region corresponding to the combined weather radar data set, determining whether a non-convective region exists above the convective weather structure within an ordinary aircraft flight altitude range;
in response to determining that a non-convective region exists above the convective weather structure within an aircraft ordinary flight altitude range, identifying an aircraft in flight with a heading toward the convective weather structure;
determining a potential change of at least one of heading and altitude for the identified aircraft through the non-convective region above the convective weather structure; and
outputting the potential change of at least one of heading and altitude to the identified aircraft in flight with a heading toward the convective weather structure.

18. A system comprising:
a memory; and
one or more processors coupled to the memory, the one or more processors configured to:
receive first weather radar data from a first weather radar system, wherein the first weather radar system comprises a ground-based weather radar system;
determine a region of interest;
identify one or more aircraft in flight proximate to the region of interest;
transmit a request for weather radar data to the one or more aircraft;
receive second weather radar data from one or more aircraft weather radar systems, wherein the second weather radar data from the one or more aircraft weather radar systems is received in response to the request for weather radar data to the one or more aircraft;
convert the first weather radar data and the second weather radar data into a uniform data format;
select weather radar data from the second weather radar data that corresponds to substantially the same time and volume of airspace as the first weather radar data;
generate a combined weather radar data set from an initial integrated data set comprising a plurality of horizontal and vertical volume cells, wherein the one or more processors fill each volume cell of the plurality of volume cells from either the selected weather radar data or from the first weather radar data based on predetermined criteria;
generate an output based on the combined weather radar data set, wherein the output a comprises a horizontal weather radar output and a vertical weather radar output.

19. The system of claim 18, wherein the one or more processors are further configured to:
identify one or more leader aircraft operating in or heading toward a region of interest;
identify one or more follower aircraft behind and on a similar heading to the one or more leader aircraft;
send a request for the second weather radar data to two or more aircraft weather radar systems including:
a first aircraft weather radar system onboard at least a first aircraft from among the one or more leader aircraft; and
a second aircraft weather radar system onboard at least a second aircraft from among either the one or more leader aircraft and the one or more follower aircraft,
wherein receiving the second weather radar data from the one or more aircraft weather radar system comprises:
receiving weather radar data from the first aircraft weather radar system onboard a first aircraft from among the one or more leader aircraft; and
receiving weather radar data from the second aircraft from among either the one or more leader aircraft and the one or more follower aircraft,
wherein the one or more processors are further configured to transmit the output based on the combined weather radar data set to the one or more follower aircraft.

20. The system of claim 18, wherein the one or more processors are further configured to:
determine whether a convective weather structure exists in a region corresponding to the combined weather radar data set;
in response to determining that a convective weather structure exists in a region corresponding to the combined weather radar data set, determine whether a non-convective region occurs at a higher altitude above the convective weather structure, wherein the non-convective region occurs within an aircraft ordinary flight altitude range;

identify an aircraft in flight with a heading toward the convective weather structure;

determine a potential change of at least one of heading and altitude for the identified aircraft through the non-convective region above the convective weather structure; and output the potential change of the at least one of heading and altitude to the identified aircraft in flight with a heading toward the convective weather structure.

* * * * *